United States Patent [19]

Dearlove et al.

[11] 4,187,348

[45] Feb. 5, 1980

[54] THERMOSET IMIDAZOLE CURED EPOXY-POLYSULFIDE RUBBER AUTOMOTIVE BODY SOLDER

[75] Inventors: Thomas J. Dearlove, Troy; Richard K. Gray, Warren; Richard P. Atkins, Royal Oak, all of Mich.

[73] Assignee: General Motors Corporation, Detroit, Mich.

[21] Appl. No.: 917,670

[22] Filed: Jun. 21, 1978

[51] Int. Cl.² ............................................. C08L 63/02
[52] U.S. Cl. ............................... 428/418; 260/37 EP; 260/37 M
[58] Field of Search ............ 260/37 M, 37 EP, 830 S; 428/418

[56] References Cited

U.S. PATENT DOCUMENTS

| | | | |
|---|---|---|---|
| 2,798,833 | 7/1957 | Lapsensohn et al. | 154/45.9 |
| 2,955,327 | 10/1960 | Beardslee et al. | 18/59 |
| 3,256,135 | 6/1966 | Weinheimer et al. | 161/185 |
| 3,356,645 | 12/1967 | Warren | 260/47 |
| 3,488,212 | 1/1970 | MacIntosh et al. | 260/37 EP |
| 3,579,473 | 5/1971 | Salensky | 260/37 EP |
| 3,849,366 | 11/1974 | Patrick | 260/37 EP |
| 3,894,977 | 7/1975 | Brown et al. | 260/18 EP |
| 3,923,571 | 12/1975 | Aoki et al. | 156/94 |

*Primary Examiner*—Lewis T. Jacobs
*Attorney, Agent, or Firm*—Elizabeth F. Goldberg

[57] ABSTRACT

In a preferred embodiment, a spreadable, thermosetting automotive body solder is comprised of 100 parts of an epoxy resin adduct of epichlorohydrin and bisphenol A, 25 to 40 parts liquid polysulfide rubber, 0.02 to 0.06 moles of an imidazole curing agent substituted in the 2-position with a hydrocarbon group, and a filler system consisting of 5 to 20 parts aluminum powder, 10 to 20 parts ion-exchanged clay, 3 to 6 parts wetting agent for the clay, and 70 to 130 parts fibrous or plate talc average particle size 3 microns or less. The composition is workable for several hours at room temperatures but cures in a few minutes at temperatures over 100° C. The filler system provides the body solder with thixotropic properties at room temperatures, and sag resistance in both the cured and uncured states at temperatures up to 200° C. The solder is corrosion resistant without other additives.

5 Claims, 5 Drawing Figures

THERMOSET IMIDAZOLE CURED EPOXY-POLYSULFIDE RUBBER AUTOMOTIVE BODY SOLDER

BACKGROUND OF THE INVENTION

This invention relates to thermosetting imidazole cured epoxy-polysulfide rubber compositions particularly suited for use as automotive body solders. More particularly, the invention relates to epoxy-polysulfide rubber based compositions containing a filler system of aluminum powder, an ion treated clay, a wetting agent for the clay, a fibrous or plate-like talc, and optionally, fumed silica. The system provides a composition with excellent physical properties.

Sheet metal automotive body panels are generally joined by welding their overlapped depression edges. The resulting trough-like joints are then filled in with lead based solder.

Considerable effort has been directed toward replacing lead solder with a lighter, less expensive polymeric material. However, such replacement must be as adaptable as lead to assembly line use. That is, the polymeric solder should lend itself to rapid application and cure. It cannot sag on a vertically oriented surface at either room or elevated cure temperatures. The cured solder must be readily sandable and form a smooth feather edge with adjacent sheet metal. It must be compatible with automotive finishing systems and able to withstand paint oven temperatures up to about 200° C. without sagging or degrading. The painted solder must be resistant to delamination or flaws brought about by corrosion, impact and thermal cycling.

We know of no resinous body solder, other than those described herein, which meets these requirements. Certain combinations of epoxy resin, flexibilizers, and solid imidazole curing agents have shown some promise as substitutes for lead solder. See, for example, U.S. Pat. No. 3,923,571, relating to dispersed solid imidazole curing agents in liquid or semisolid epoxy compositions. However, these body solder systems are deficient in at least two critical respects. First, if the uncured resins are thickened enough to prevent sag on vertical surfaces, they are too tacky to be applied with a trowel or other tool. Instead they require the use of a removable plastic backing sheet for application to a car body; and second, unless substantial amounts of toxic lead or chromate containing anti-corrosion pigments are added to the epoxies, the solders suffer drastic decreases in strength with time, especially under high temperature or humidity conditions. The patent suggests that the solders may be applied at thicknesses of only 4 millimeters or less and that fillers, plasticizers, and other resin additives may be incorporated in the basic composition without any special consideration.

We have discovered that the type, amount, and even the shape of filler constituents are important to achieving workable body solders with all of the above mentioned desirable characteristics. More specifically, we have discovered a unique system of filler constituents which in combination with each other provide imidazole cured epoxy-polysulfide rubber resins with unexpected sag resistance, spreadability, adhesion to sheet metal, resistance to failure under impact, corrosion resistance and more.

OBJECTS OF THE INVENTION

It is an object of our invention to provide an imidazole cured epoxy-polysulfide rubber based thermosetting automotive body solder which may be applied directly to metal using caulking cartridges, metering and mixing equipment, or by spreading with a trowel or other such tool. It is a further object to provide such a resin that will not sag in a cured or uncured state, when applied to a vertically oriented surface at temperatures up to about 200° C. It is another object to provide an epoxy-based resin with a cure time of only a minute or two at temperatures of about 150° C. It is another object to provide an epoxy resin which is abradable to a fine, smooth, paintable finish after cure. Still another object is to provide an epoxy-based body solder which is compatible with all standard automotive paint systems including electrophoretic deposition. It is a further object to provide a solder which can withstand extended exposure to heat, cold, humidity, salt spray and more without appreciable loss of adhesion to a metal substrate or deterioration of the resin, particularly without the addition of toxic anti-corrosion agents.

BRIEF SUMMARY OF THE INVENTION

In accordance with a preferred practice of our invention, these and other objects may be accomplished by formulating a body solder as follows. The amount of each constituent is in parts by weight unless otherwise stated.

100 parts of a bisphenol A-epichlorohydrin epoxy resin having an epoxide equivalent weight in the range of 180 to 200 are mixed with 25 to 40 parts of a liquid, polysulfide rubber, number average molecular weight about 1,000. The rubber serves as a flexibilizer for the rigid epoxy resin compound, and increases its adhesive strength. 10 to 20 parts of an ion-exchanged clay, and 3 to 6 parts of a wetting agent for the clay, are then added. Next, from about 5 to 20 parts 325 mesh aluminum powder are provided to give the composition extra strength, electrical conductivity and machinability. From about 50 to 130 parts talc, wherein the individual talc particles are primarily fibrous or plate-like in nature, are then combined with the other ingredients. The average particle size of the talc should be about 3 microns or less to attain the desired sag resistance. From about 0.2 to 0.6 moles of a liquid imidazole compound, substituted in the 2-position with a hydrocarbon group, are added to promote rapid cure of the resin at elevated temperatures.

Our invention is the particular combination of the above mentioned clay, wetting agent, talc and aluminum. The absence of these constituents, or the use of too much or too little of any one of them, drastically affects the physical properties or handling characteristics of a composition in both its cured and uncured states. For example, the ion-exchanged clay is a known thixotropic agent. However, it provides the uncured resin with sag resistance only when used in combination with a wetting agent and an above specified talc; or, when too much aluminum powder is employed, the resin exhibits poor handling characteristics.

Our body solders may be made as one or two part compositions. Once the epoxy and imidazole curing agent are mixed, the compositions have a usable pot life of at least 4 hours, and a cleanable pot life of 2 to 3 days at room temperatures. The solder may be pumped or skived onto a vertical surface at thicknesses of 20 mm or more without dragging or sagging. The compositions cure in 5 minutes or less at 120° C. by the simple application of heat from, for example, infrared lamps. A cure time of about 2 minutes at a resin temperature of about 120° C. is normal. The resin may be sanded as soon as it is cured and forms an excellent feather edge with sheet metal. The solder is not degraded by further heating to temperatures as high as 200° C. during subsequent cleaning, phosphating and painting processes. The cured resin is resistant to degradation by impact, thermal cycling, salt spray, moisture and more.

DETAILED DESCRIPTION OF THE INVENTION

Our invention may be more clearly understood in view of the detailed description which follows:

In the drawings, FIG. 1 is a photomicrograph at 1000X magnification of Nytal ® 400 talc showing the generally fibrous nature of individual talc particles;

Figure 4:
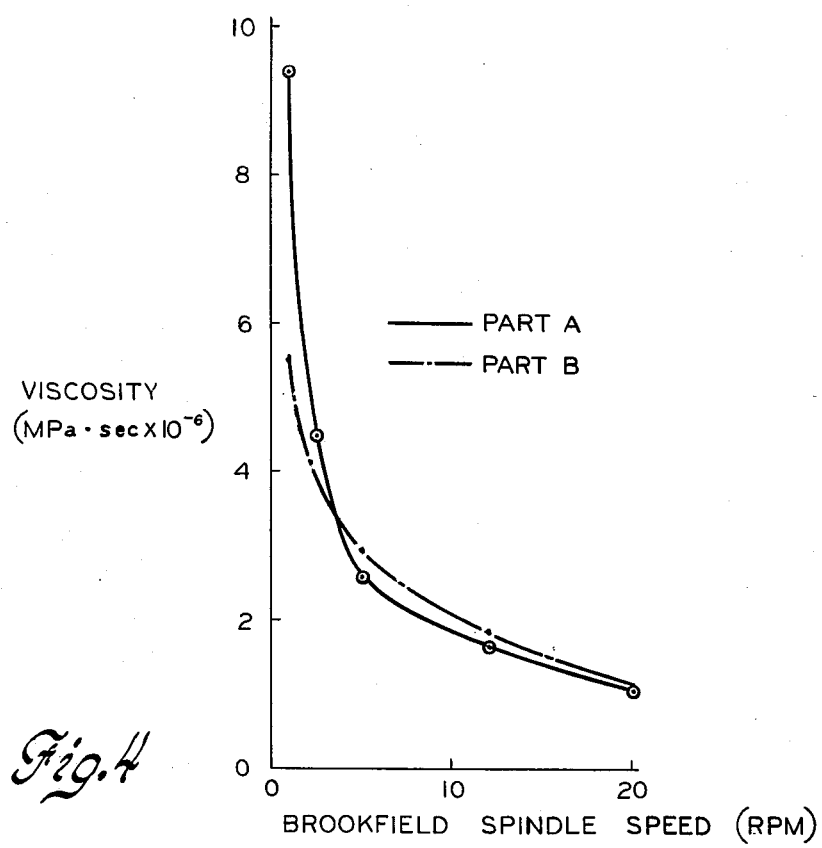
Figure 5:
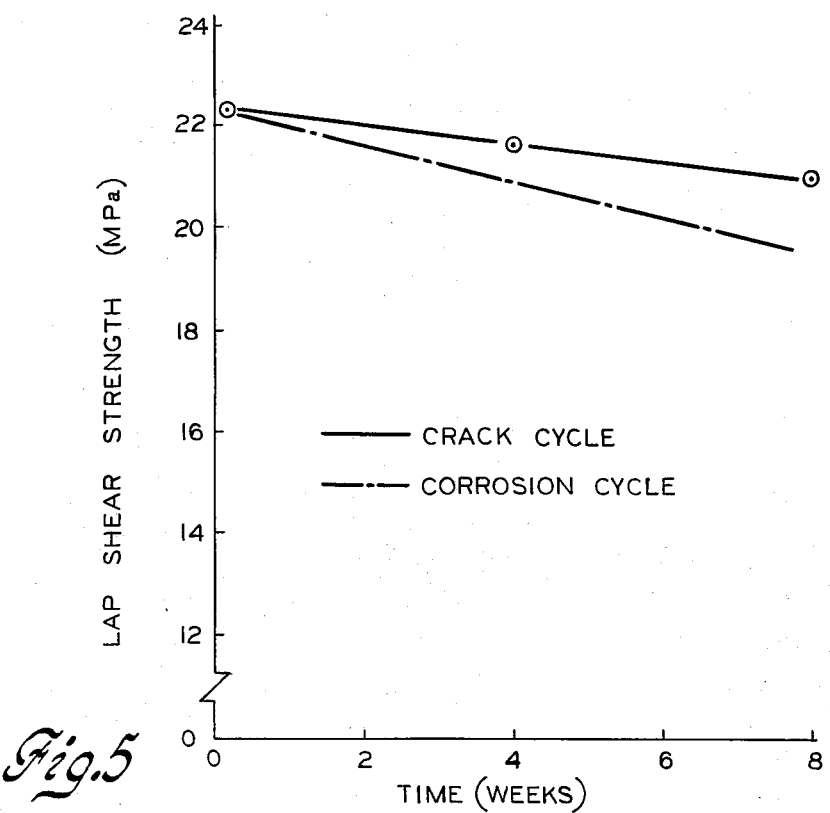

FIG. 4 is a graph of viscosity versus Brookfield Viscometer spindle shear rates for each component of a two-part solder system. The curves indicate their thixotropic natures; and FIG. 5 is a plot of lap shear strength of a solder composition plotted against time spent in crack and corrosion test cycles. The curve is indicative of the durability of our solders under adverse environmental conditions.

In accordance with the practice of our invention, preferred solder constituents may be described as follows.

By epoxy resins, herein are meant adducts of epichlorohydrin and bisphenol A having epoxy equivalent weights in the range of from about 180 to 200. These resins may also be referred to as diglycidyl ethers of bisphenol A (DGEBA). Preferably, the epoxy resins are liquid to facilitate mixing with the other ingredients and promote mixtures with spreadable viscosities.

Cured bisphenol A-epichlorohydrin resins are fairly rigid. Thus, a flexibilizer is required for our solder systems. A number of different types were tried including flexible epoxy resins as well as carboxylic acids and amino terminated polybutadienes. Surprisingly, none of these flexibilizers provided the epoxy resin with adequate shear strength or tensile elongation. Higher flexibilizer loading levels did not improve the properties.

Polysulfide rubbers were found to be suitable flexibilizers for our body solder compositions. Liquid mercaptan terminated polysulfides, number average molecular weight about 1,000, are particularly useful. We have found that the lower the viscosity of the polysulfide constituent, the easier it is to mix it with the other constituents. Commercially available polysulfide polymers are listed below in Table I along with other commercially available solder constituents.

Various amounts of liquid LP-3 polysulfide rubber were mixed with an epoxy resin (without any other filler) and cured with 1-(2-hydroxypropyl)2-methylimidazole (HPMI) for 15 minutes at 150° C. The addition of up to 40 parts polysulfide rubber to 100 parts epoxy resin increased the epoxy's tensile and flexural strengths. The maximum increase in strength was generally obtained at about 25 parts rubber. Polysulfide rubber levels greater than 40 parts in our solder compositions caused drastic decreases in cohesive strength especially at temperatures found in paint drying ovens.

Compounds of the imidazole family are known to be excellent curing agents for aromatic epoxy compounds. We found that only those imidazoles substituted in the 2-position with a straight chain or branched aliphatic or aromatic hydrocarbon group cure our epoxy-polysulfide rubber solder compositions. For example, 1-(2-hydroxy-3-butoxypropyl)-imidazole and 1-(2-hydroxypropyl)-imidazole were each added to a mixture of 100 parts epoxy resin and 30 parts polysulfide rubber. Neither imidazole cured the mixture at temperatures of about 150° C. However, 1-(2-hydroxypropyl)2-methylimidazole (HPMI), 2-ethyl-4-methylimidazole and 1,2-dimethylimidazole were all found to rapidly affect a cure of the same mixture at the same temperature. Thus, we believe that any imidazole compound substituted in the 2-position will affect the cure of our epoxy resins. A liquid imidazole is preferred so that no minimum temperature is required to melt and activate it. The imidazoles are preferably used in amounts of 0.02-0.06 moles per 100 parts by weight DGEBA resin. Once a liquid imidazole is mixed with the epoxy constituent of our solders, the mixture has a room temperature pot life of about 2 or 3 days. However, it will cure rapidly (i.e., in a few minutes or less) at temperatures of about 100° C. and higher. Our solders generally cure evenly without forming gel particles upon standing.

From about 5 to 20 parts aluminum powder are added as filler. The powder particles preferably have an average size of about 15 microns. We have found that the addition of aluminum adds shear strength, machinability, and thermal conductivity to the cured composition. In particular, the aluminum powder promotes the sandability of a cured resin to produce a smooth feather edge at solder-sheet metal junctions.

Another important constituent is a modified clay, preferably of the bentonite or kaolin type. Such modified clays are made by reacting a highly refined mineral clay with a salt, typically an ammonium salt, of a long chain organic compound such as dimethyldihexadecane. The metal cation of the clay is exchanged with the cation of the salt to form the corresponding organo-clay complex. Herein, such modified clay may be referred to as ion-exchanged clay. Although their effects in liquid polymeric compositions are not fully understood, treated clays used in conjunction with wetting agents therefore swell to provide the compositions with thixotropic properties. Such ion-exchanged clays are incorporated within our systems in amounts of from about 10 to 20 parts per 100 parts epoxy.

A number of low molecular weight, oxygen containing compounds such as propylene carbonate and dimers of fatty acids are known to act as wetting agents for ion-exchanged clays. Two such agents are Byktone ® and Anti-Terra U ® made by Byk-Mallinckrodt. The use of 3 to 6 parts of such agent per 100 parts epoxy promotes dispersion and swell of the clay. However, we found that such wetting agents unexpectedly improved the handling characteristics of the uncured resins. When all other constituent were combined, but the wetting agent omitted, a stringy composition was formed. The wetting agent totally cured this defect.

In conjunction with the clay and the wetting agent, we also require from about 50 to 130 parts talc per 100 parts epoxy, said talc having an average particle size no larger than about 3 microns. We found that with the larger particles, the solder has virtually no sag resistance prior to cure. Talc particles themselves should be primarily either fibrous or plate-like in shape.

Figure 1:
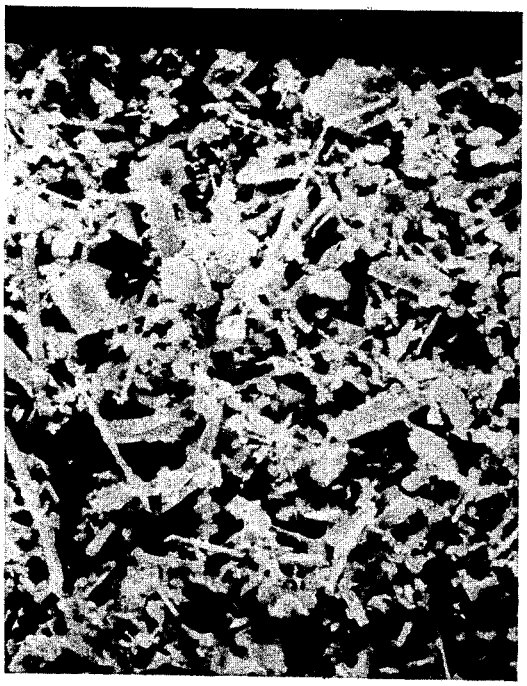
Figure 2:
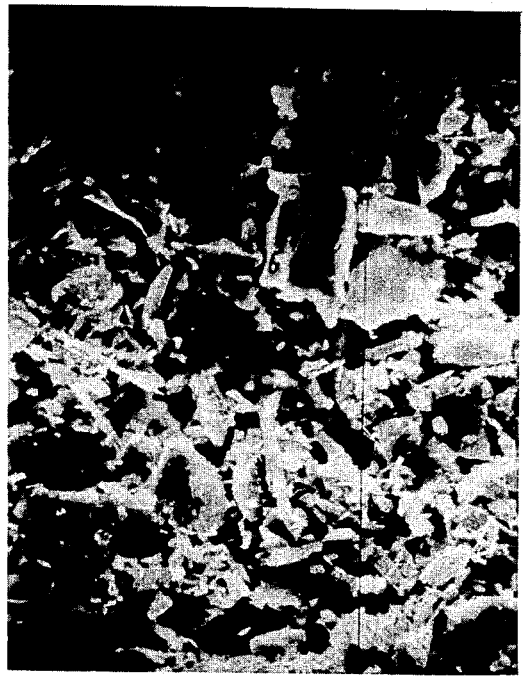
FIG. 2 is a photomicrograph at 1000X magnification of Nytal ® 200 talc showing fibrous particles of substantially larger size than Nytal ® 400.

FIG. 1 is a photomicrograph at 1000 X magnification of Nytal ® 400 talc. It can be seen from the photomicrograph that the shape of a large percentage of the talc particles is substantially fiber-like. This talc has been found to be particularly suited to the practice of our invention, the particles having an average size of about 3 microns. FIG. 2 shows a photomicrograph of Nytal ® 200 fibrous talc, average particle size about 5 microns, at 1000X magnification. Nytal ® 200 did not provide our solder compositions with sag resistance, thus we believe the talc particle size to be important.

Figure 3:
FIG. 3 is a photomicrograph at 1000X magnification of Emtal ® 599 talc showing the plate-like nature of individual talc particles.

FIG. 3 is a photomicrograph at 1000X magnification of Emtal ® 599. As seen in the micrograph, the talc particles are generally plate-like in nature. They have an average particle size of about 2.7 microns and are also very useful for our invention. Emtal ® 549 (not shown), average particle size about 3.5 microns, was found unsuitable for our invention.

Other well known fillers, including micron size particles of aluminum silicate, fumed silica, and clays were substituted for fibrous and plate-like talc in a number of our resin formulations. None provided sufficient sag resistance to the solder. Even those that resisted sag at room temperatures failed when resins were heated to temperatures of about 150° C. When the fillers were added in large amounts to thicken the resin mixtures, they could not be worked with a trowel or other spreading devices. However, a small portion of fumed silica, up to about 6 weight percent of the epoxy resin, may be used to slightly increase the viscosity of a talc-containing composition without disrupting a solder's physical properties.

TABLE I

| Body Solder Constituents | | |
| --- | --- | --- |
| DGEBA Resins | Araldite 6005 | Ciba-Geigy |
| | DER 330 | Shell |
| | EPON 828 | |
| Polysulfide Rubber | LP-3 | Thiokol Chemical |
| | LP-33 | |
| Aluminum Powder | Al-123 | Alcoa |
| Talc | NYTAL 400 | R.T. Vanderbilt |
| | EMTAL 599 | Eastern Magnesia |
| Clay | Astratone 40 | Baker & Collinson |
| | Claytone | Southern Clay Products |
| Wetting Agent | Byktone | Byk-Mallinckrodt |
| | Anti-Terra U | |
| Catalyst | AP 5 (HPMI) | Archem |

The subject body solders may be prepared as either one or two-component systems. In a one-component system all the ingredients are combined with care being taken to add the imidazole catalyst at a temperature where its activity is suppressed, preferably at about 25° C. or below. The mixtures may be immediately cooled after mixing, and when maintained at temperatures of 0° C. or below, have a workable pot life of 3 to 4 weeks.

EXAMPLE I

In a typical laboratory preparation of a preferred one-component solder, a mixture containing 1,000 grams of Araldite 6005 liquid DGEBA epoxy resin, and 385 grams of LP-3 liquid polysulfide rubber was preheated to 100° C. The mixture was placed in a helical blade mixer with a water jacketed bowl maintained at a temperature of 45° to 50° C. The resin was stirred and degassed for 1 hour under a vacuum of about 0.11 mm of mercury. 150 grams Astratone 40 ion-exchanged clay and 100 grams Al-123 aluminum powder were added and the mixture stirred for an additional half hour. 45 grams Byktone ®, a wetting agent for the clay, were added. The mixture was stirred briefly and allowed to degas under vacuum overnight without further stirring. 1,050 grams Nytal 400 were then added in several portions and thoroughly mixed with the other constituents under a vacuum for 2 hours. The mixer bowl was then cooled for 1 hour with cold water. 56 grams (0.4 moles, or 0.04 moles per 100 grams epoxy resin) 1-(2-hydroxypropyl)2-methylimidazole catalyst were introduced, the mixture degassed for 2 minutes without stirring, and then stirred for 15 minutes with vacuum. The body solder mixture was loaded directly into 177 ml caulking cartridges. The cartridges were stored at 0° C. for later use.

For large scale production, we prefer a two-component solder system, one of the components containing the epoxy resin, and the other the imidazole curing agent. Then, each component has a nearly indefinite pot life so that large batches can be made up ahead and stored. The components are mixed together immediately prior to application in standard metering and mixing equipment. It will be obvious to those skilled in the art that the distribution of resin, flexibilizer, and fillers between the two parts will depend, at least in part, on the volume:volume ratio of the particular metering and mixing equipment used as well as the viscosity of each of the components. The closer the viscosities of the separate components, the more readily they can be thoroughly blended without excessive agitation.

EXAMPLE II

A preferred two-part body solder was made as follows. For Part A, the water jacketed bowl of a Meyers rubber dispersing mixer was preheated to 65° C. 19.2 kilograms Araldite 6005 epoxy resin preheated to 100° C. were charged into the bowl, stirred, and degassed under a vacuum of 0.1 mm of mercury for approximately 2 hours. 2.16 kilograms Astratone 40, predried at 100° C. for a minimum of 30 minutes, and 1.44 kilograms Al-123 aluminum powder were added in succession to the bowl without stirring. The mixture was then stirred under vacuum for half an hour. Next, 0.65 kilogram, a propylene carbonate wetting agent, Byktone, was added and the mixture degassed for 30 minutes with stirring and then overnight without stirring. 15.1 kilograms Nytal 400 were added in 5 equal portions, each addition being followed by a minimum of 0.5 to 0.75 hours degassing. Completed Part A was transferred from the mixer bowl to a 19 liter straight walled steel pail using a follower plate and pump assembly. Care was taken to maintain the discharge pipe below the surface of the solder to minimize any air entrapment.

The B component was formed in the Meyers mixer in the same manner from 7.39 kilograms LP-3 polysulfide rubber, 0.48 kilograms Al-123 aluminum, 0.72 kilograms Astratone 40, 0.22 kilograms Byktone, 5.05 kilograms Nytal 400, and 1.08 kilograms HPMI. The completed B component was pumped into a second 19 liter pail in the same manner as Component A.

Table II shows the composition of the two solder components of Example II.

TABLE II

| | Two Component Body Solder | |
|---|---|---|
| Component | A* (pbw) | B* (pbw) |
| Araldite 6005 | 1000 | |
| LP-3 | | 385 |
| Al-123 | 75 | 25 |
| Astratone 40 | 112.5 | 37.5 |
| Byktone | 33.8 | 11.2 |
| Nytal 400 | 788 | 262 |
| HPMI | | 56 |

*Density of Part A 1.49 g/cc; density of Part B 1.54 g/cc

The viscosities of the A and B components were determined at 25° C. with a Brookfield viscometer using a No. 7 spindle. The spindle speed was varied between 1 and 20 revolutions per minute for the determination of sample viscosity as a function of shear rate. The samples were stored separately in 177 ml glass bottles and were equilibrated for a minimum of 24 hours in an air bath at 25° C. prior to the viscosity determinations. FIG. 4 shows the viscosity of each component as a function of Brookfield spindle speed. It can be seen from the Figure that each component is thixotropic in nature, i.e., as the spindle speed is increased, the viscosity of the material decreases. The curves also indicate, as was found to be fact, that the viscosities of the components are similar enough to assure complete mixing at relatively low shear. Although each of the A and B components is thixotropic in nature, neither exhibited any sag resistance on a vertical surface on its own. The A and B components were stored in the pails for later use.

In the course of our research, the physical properties of various body solder formulations were determined on standard test panels. The panels comprise 2 sheets of 0.94 mm thick steel with overlapping depressed edges pinchwelded at the center. The weld forms a trough about 76.2 mm wide and 6.4 mm deep. Each welded panel is square with a length of about 254 mm per side. The panels were prepared for soldering by wiping with a solvent or vapor degreasing in trichloroethane followed by grit blasting or sanding.

One-component solders (made as in Example I) were applied to test panels using a pneumatically operated caulking gun with a 7 mm by 90 mm orifice stainless steel nozzle. The edges of the solder were feathered with a putty knife followed by a skiving operation with a wide blade to give a uniform contour to the solder surface. Two-component systems were applied with metering and mixing equipment made by the Pyles Corporation. Knowing the specific gravity and weight of Parts A and B for a given formulation, the volume of each part was calculated. The proper mix ratio of A and B was determined on a volume basis and the metering equipment suitably adjusted. The components were pumped from storage pails, combined at the mixing head, and immediately delivered to an applicator nozzle. The body solders were liberally applied in layers 10 mm thick or more, to facilitate subsequent contour sanding of the joints.

The test panels were cured for 10 minutes in an oven preheated to 150° C. using a rack to hold the samples upright at 10° from the vertical. A body solder that slumped, or in any way lost its contour, was considered to have unacceptable sag resistance.

The cured solder samples were prepared for painting by first rough sanding with a 50 grit, 177.8 mm diameter sanding disc mounted on a 6,000 rpm air driven grinder. The samples were then given an intermediate finishing with a 60 grit, 196 mm diameter open coat sanding disc mounted on a 3,000 rpm air driven grinder, and were finish sanded with an 80 grit, 196 mm diameter open coat sanding disc. The sandability, feather edge and porosity characteristics of the samples were subjectively evaluated at this time. Those samples with a poor feather edge or visible surface porosity were considered unacceptable. With respect to porosity, care must be taken to prevent entrapment of gas bubbles during mixing and application. Our compositions yield pock-free surfaces when such care is taken.

Test panels were cleaned and phosphated prior to a desired painting operation. Many combinations of paint systems have been tried, all successfully. These systems included combinations of all or some of the following coating steps, in the listed order: (1) electrophoretic or nonaqueous dispersion coating: (2) a solvent based flash primer: (3) a solvent based primer surfacer and seal coat, or water based primer surfacer; and (4) an enamel or acrylic topcoat.

The painted panels were evaluated using three standard environmental tests: 1. Salt Spray Corrosion Cycle: panels are placed in a 5% sodium chloride salt spray solution at 100° C. for 4 hours followed by 18 hours at 37.8° C. 100% relative humidity and 2 hours at −23° C. Four of these cycles are run per week, the sample being retained in the cold box at −23° C. at other times. The sample must pass 32 of the above cycles without developing any flaws.

2. Crack Cycle: panels are placed in 100% relative humidity chamber at 37.8°C. for 24 hours followed by 20 hours at −23° C. and 4 hours at room temperature. Two of these cycles are run per week, the sample being retained in the cold box at −23°C. at other times. A total of 16 cycles without paint flaws is required for passing the test.

3. Environmental Cycle: panels are subjected to the test cycle set out below in Table III.

TABLE III

| | Environmental Test Cycle | |
|---|---|---|
| Location | Conditions | Time |
| Cold box | −29° C. | 17 hrs. |
| Oven | 70° C. | 72 hrs. |
| Humidity room | 38° C., 100% R.H. | 24 hrs. |
| Cold box | −29° C. | 7 hrs. |
| Humidity room | 38° C., 100% R.H. | 17 hrs. |
| Oven | 70° C. | 7 hrs. |
| Humidity room | 38° C., 100% R.H. | 24 hrs. |

At the end of each period in the cold box, the solder joint is impacted twice by a 534 gram steel ball dropped from a height of 30.5 centimeters resulting in an impact force of 1.7 joules. Loss of adhesion or cracking constitutes a failure. The cycle is repeated 8 times.

The lap shear strengths of different formulations were obtained by bonding two steel coupons 101.6 mm long, 25.2 mm wide, and 2.2 mm thick with a 0.127 mm thick layer of the solder along a 12.7 mm wide overlap at an edge. The samples were cured under 112 kilopascals pressure for 30 minutes at 150° C. Lap shear strengths were determined according to ASTM D-1002-72 on an Instron testing machine.

Shear impact strengths of solder compositions were determined on a Tinius-Olsen impact tester according to ASTM D-950-72. The bonding area of the test specimen was about 645 mm square. The layer of adhesive was 0.127 mm thick.

Three preferred formulations of our unique body solder compositions are set forth in Table IV. Solder XBS1 corresponds in composition to the one-component and two-component system mixtures set forth above in Examples I and II. Solders XBS2 and XBS3 are different formulations within the scope of our invention but they may also be prepared as one or two-component systems by the same methods.

TABLE IV

| Cross-Linking body Solder Compositions | | | |
| --- | --- | --- | --- |
| Material (pbw) | XBS1 | XBS2 | XBS3 |
| DGEBA | 100 | 100 | 100 |
| LP-3 Polysulfide Rubber | 38.5 | 36.9 | 27.5 |
| Astratone 40 | 15 | 20 | 16 |
| Byktone | 4.5 | 4.5 | 5 |
| HPMI | 5.6 | 6 | 6 |
| Nytal 400 | 105 | — | — |
| Emtal 599 | — | 75 | 76 |
| Aluminum Powder | 10 | 15 | 15 |
| Fumed Silica Powder | — | — | 4 |
| Salt-Spray Cycle | Pass | Pass | Pass |
| Crack Cycle | Pass | Pass | Pass |
| Environmental Cycle | Pass | Pass | Pass |
| Sag Resistance at 200° C. | Pass | Pass | Pass |
| Lap Shear (kPa) | 22,400 | 17,950 | 16,700 |
| Shear Impact (joules/cm$^2$) | 3.4 | 2.1 | 2.0 |

Each of these solder formulations was subjected to the above described regimen of tests. The results are shown in Table IV. Each passed the salt-spray crack cycle, and environmental tests without developing any flaws. Moreover, each formulation showed excellent lap shear and shear impact values. All could be applied to verticaly oriented seams without sagging, cured within 2 minutes at 120° C., sanded to a fine finish with a neatly feathered edge, and painted by any commonly used method. The cured samples did not sag when vertically retain in a 200° C. oven for 120 minutes.

One group of several XBS1 test panels was subjected to eight weeks of the above described crack cycle, and another XBS1 panel group to the corrosion cycle. FIG. 5 shows that the XBS1 resin retained about 95% of its original lap shear strength in the crack cycle and about 85% of its original lap shear strength in the corrosion cycles. Samples of XBS2, average lap shear strength 17,950 kPa, were continuously subjected to 100° relative humidity at 38° C. for thirty days. They were found to have retained 87.5% of their lap shear strength at the end of the test. The results of these tests indicate strongly that our body solders form an extremely tenacious bond with steel which is not subject to failure under conditions of humidity, thermal cycling or corrosive salt spray.

We have found that the physical properties of imidazole cured epoxy-polysulfide rubber automotive body solders can be greatly enhanced by a novel combination of fillers. That is, when aluminum powder, an ion-exchanged clay, a wetting agent for the clay, and talc with fibrous or plate-like particles are added in specified amounts to an imidazole cured epoxy-polysulfide rubber mixture, a spreadable, rapidly curable, paintable, corrosion resistant body solder is formed. A further built-in advantage of our plastic body solders is a weight-savings in replacing lead. For example, a car that would require 1,400 grams of lead would require only 200 grams of our solder composition, a weight-savings of 1,200 grams. While body solders according to our invention must contain the above specified ingredients, those skilled in the art may add small amounts of other ingredients without interfering with the practice of the invention.

While our invention has been described in terms of specific embodiments thereof, it will be appreciated that other forms could readily be adapted by one skilled in the art. Accordingly, the scope of our invention is to be considered limited only by the following claims.

The embodiments of the invention in which an exclusive property or privilege is claimed are defined as follows:

1. A spreadable thermosetting automotive body solder composition comprised in parts by weight of
   100 parts of an epoxy resin adduct of epichlorohydrin and bisphenol A, said adduct having epoxy equivalent weight in the range of from about 180 to 200;
   from about 25 to 40 parts of a liquid polysulfide polymer having a number average molecular weight of about 1,000;
   from about 0.02 to 0.06 moles imidazole curing agent, said imidazole being substituted in the 2-position with a hydrocarbon group;
   and a filler system consisting essentially of
   from about 5 to 20 parts aluminum powder;
   from about 10 to 20 parts ion-exchanged clay;
   from about 3 to 6 parts of a wetting agent for said clay; and
   from about 70 to 130 parts talc having particles substantially in the shape of short fibers or platelets with an average particle size of about 3 microns or less,
   wherein said filler system provides said body solder with thixotropic properties in the uncured state and sag resistance in the cured and uncured states at temperatures of up to about 200° C.

2. A spreadable thermosetting automotive body solder composition comprised in parts by weight of
   100 parts of an epoxy resin adduct of epichlorohydrin and bisphenol A, said adduct having epoxy equivalent weight in the range of from about 180 to 200;
   from about 25 to 40 parts of liquid polysulfide polymer having a number average molecular weight of about 1,000;
   from about 0.02 to 0.06 moles imidazole curing agent, said imidazole being substituted in the 2-position with a hydrocarbon group;
   and a filler system consisting essentially of
   from about 5 to 20 parts aluminum powder;
   from about 10 to 20 parts ion-exchanged clay;
   from about 3 to 6 parts of a wetting agent for said clay;
   from zero to about 6 parts fumed silica; and
   from about 70 to 130 parts talc having particles substantially in the shape of short fibers or platelets with an average particle size of about 3 microns or less,
   wherein said filler system provides said body solder with thixotropic properties in the uncured stage and sag resistance in the cured and uncured states at temperatures of up to about 200° C.

3. A layer of a thermosetting automotive body solder composition adhered to a metal surface, said layer having a thickness of about 20 millimeters or less and being comprised in parts by weight of
   100 parts of an epoxy resin adduct of epichlorohydrin and bisphenol A, said adduct having epoxy equivalent weight in the range of from about 180 to 200;

from about 25 to 40 parts of a mercaptan terminated liquid polysulfide polymer having a number average molecular weight of about 1,000;

from about 0.02 to 0.06 moles imidazole curing agent, said imidazole being substituted in the 2-positions with a hydrocarbon group;

and a filler system consisting essentially of from about 5 to 20 parts aluminum powder;

from about 10 to 20 parts ion-exchanged clay;

from about 3 to 6 parts of a wetting agent for said clay;

from zero to about 6 parts fumed silica; and from about 70 to 130 parts talc having particles substantially in the shape of short fibers or platelets with an average particle size of about 3 microns or less, wherein said filler system provides said solder layer with thixotropic properties in the uncured state and wherein said layer resists sagging on a said metal surface that is vertically oriented in the cured and uncured states at temperatures of up to about 200° C.

4. A corrosion resistant spreadable thermosetting automotive body solder composition comprised in parts by weight of 100 parts of an epoxy resin adduct of epichlorohydrin and bisphenol A, said adduct having epoxy equivalent weight in the range of from about 180 to 200;

from about 25 to 40 parts of a liquid polysulfide polymer having a number average molecular weight of about 1,000;

from about 0.02 to 0.06 moles imidazole curing agent, said imidazole being substituted in the 2-position with a hydrocarbon group;

and a filler system consisting essentially of from about 5 to 20 parts aluminum powder;

from about 10 to 20 parts ion-exchanged clay;

from about 3 to 6 parts of a wetting agent for said clay;

from zero to about 6 parts fumed silica; and from about 70 to 130 parts talc having particles substantially in the shape of short fibers or platelets with an average particle size of about 3 microns or less, wherein said solder composition in the cured state retains at least about 85% of its initial lap shear strength as determined by ASTM D-1002-72 after being retained in air for 30 days at a temperature of about 38° C. at 100% relative humidity.

5. A corrosion resistant spreadable thermosetting automotive body solder composition comprised in parts by weight of 100 parts of an epoxy resin adduct of epichlorohydrin and bisphenol A, said adduct having epoxy equivalent weight in the range of from about 180 to 200;

from about 25 to 40 parts of a mercaptan terminated liquid polysulfide polymer having a number average molecular weight of about 1,000;

from about 0.02 to 0.06 moles imidazole substituted in the 2-position with an aliphatic group taken from the group consisting of methyl and ethyl;

and a filler system consisting essentially of from about 5 to 20 parts aluminum powder;

from about 10 to 20 parts ion-exchanged clay, wherein said clay is taken from the group consisting of bentonite and kaolin;

from about 3 to 6 parts of a wetting agent for said clay;

from zero to about 6 parts fumed silica; and from about 70 to 130 parts talc having particles substantially in the shape of short fibers or platelets with an average particle size of about 3 microns or less, wherein said filler system provides said body solder with thixotropic properties in the uncured state and sag resistance in the cured and uncured states at temperatures of up to about 200° C., and wherein said body solder in the cured state retains at least about 85% of its initial lap shear strength as determined by ASTM D-1002-72 after being retained in air for 30 days at a temperature of about 38° C. at 100% relative humidity.

* * * * *